March 3, 1942.  F. W. HARRIS  2,275,046
CLUTCH
Filed May 15, 1940  2 Sheets-Sheet 1

INVENTOR
FORD W. HARRIS
BY
HARRIS, KIECH, FOSTER & HARRIS
ATTORNEYS.

March 3, 1942. F. W. HARRIS 2,275,046
CLUTCH
Filed May 15, 1940 2 Sheets-Sheet 2
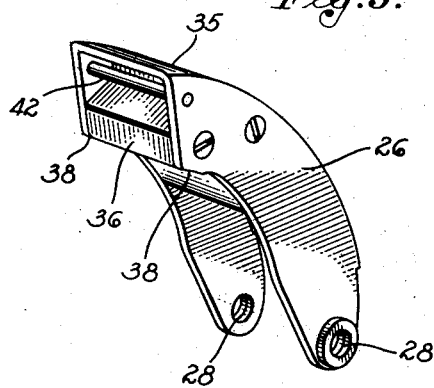
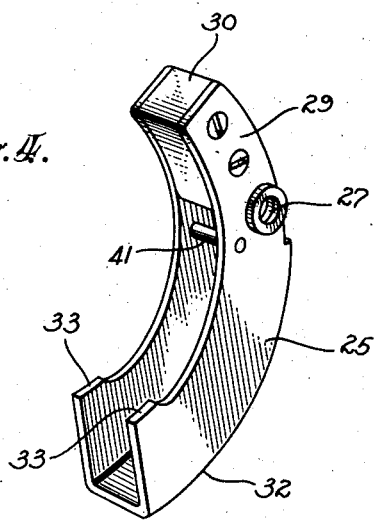
INVENTOR
FORD W. HARRIS
BY HARRIS, KIECH, FOSTER & HARRIS
ATTORNEYS.

Patented Mar. 3, 1942

2,275,046

UNITED STATES PATENT OFFICE 2,275,046

CLUTCH

Ford W. Harris, Los Angeles, Calif., assignor to Salsbury Corporation, Inglewood, Calif., a corporation of California Application May 15, 1940, Serial No. 335,293

4 Claims. (Cl. 192—103)

My invention relates to clutches which are adapted to be used between an internal combustion engine and the load to be driven by said engine and which are so constructed that with the engine at rest a forward movement of the load will start the engine. It is especially adapted for use on motorcycles in which it is desired to start the engine by pushing the motorcycle forward.

It is an object of my invention to provide such a clutch which will allow the engine to be so started but which is so constructed that the clutch will be disconnected as soon as the engine reaches idling speed. Idling speed may be defined as a rotative speed only a little higher than the lowest speed at which the engine will continue to run without load.

It is a further object of my invention to provide such a clutch which will automatically engage so that the engine can drive the load as soon as the engine is speeded up to running speed. Running speed is defined as any higher rotative speed than idling speed.

In general, it is the object of my invention to provide a clutch which can be used in a motorcycle or similar vehicle driven by an internal combustion engine which is so constructed that if the throttle of the engine is set to supply fuel only sufficient to produce idling speed of the engine, a forward push on the vehicle will start the engine without causing the engine to drive the vehicle, but as soon as the throttle is opened to a degree sufficient to cause the engine to speed up to running speed, the clutch will automatically engage so that the engine can drive the vehicle.

In particular, it is an object of the invention to provide a clutch capable of performing the above described functions, which is sufficiently compact to be practical for use in motorcycles, and other small engine driven vehicles, and which will surely and positively perform these functions.

Further objects and advantages will be made evident hereinafter.

Referring to the drawings which are for illustrative purposes only:

Fig. 4 is a perspective view of a starting clutch shoe; and

Fig. 5 is a perspective view of a running clutch shoe.

Figure 1:
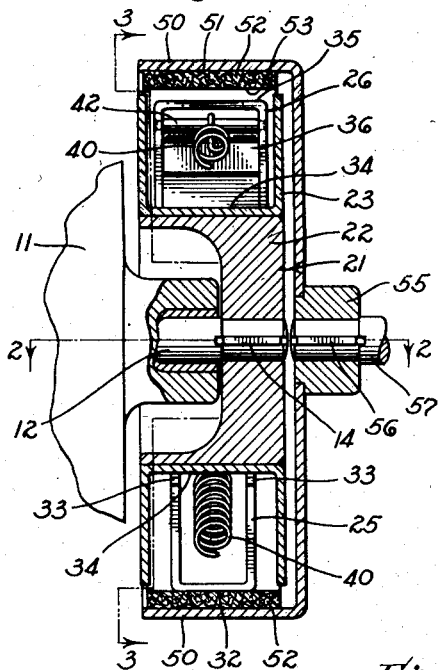
Fig. 1 is a cross-sectional view of a clutch embodying the features of my invention.
Figure 2:
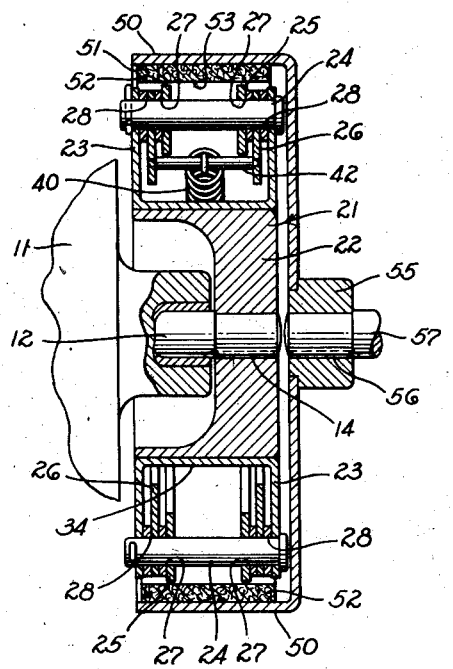
Fig. 2 is a cross-sectional view taken on the line 2—2 of Fig. 1.
Figure 3:
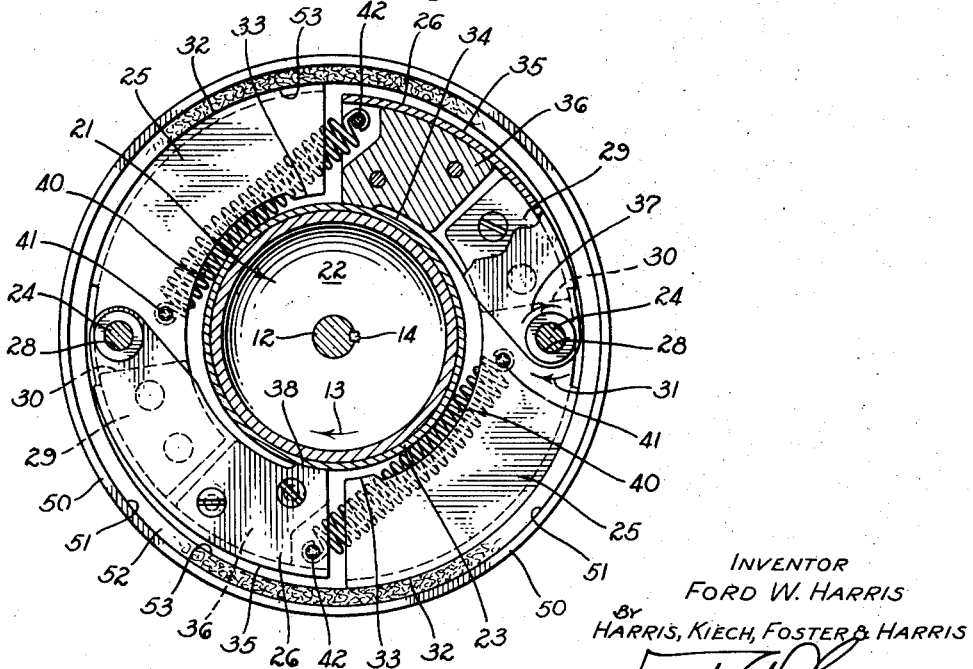
Fig. 3 is a cross-sectional view taken generally as indicated by the line 3—3 of Fig. 1.

In the embodiment of my invention shown in the drawings, 11 is a portion of an internal combustion engine having a shaft 12. This engine rotates in the direction of the arrow 13 (Fig. 3). Rigidly secured by a key 14 on the shaft 12 is a driving mechanism 21, which driving mechanism rotates with the shaft 12.

The driving mechanism 21 consists of a hub 22 to which is welded or otherwise rigidly secured a spool 23. Passing through the spool 23 are two pivot pins 24. Mounted so that they can turn freely, but only through a small arc, on each of the pivot pins 24 is a starting clutch shoe 25 and a running clutch shoe 26. Each pin 24 passes through holes 27 in a shoe 25 and holes 28 in a shoe 26. The shoes 25 and 26 are of sheet metal bent into U section as shown. Secured inside a projection 29 of each shoe 25 is a mass 30 of lead or other heavy material. When the driving mechanism is rotating this mass 30 is forced outward radially from the axis of the shaft 12 by centrifugal force and tends to rotate the shoe 25 in the direction of the arrow 31.

The starting shoe 25 has a cylindrical outer surface 32 which frictionally engages the driven mechanism when the shoe is in one extreme arcuate position. Stops 33 strike against a tube 34 of the spool 23 and limit the arcuate movement of the starting shoe away from its contact with the driven mechanism.

The running clutch shoes are provided with an outer cylindrical surface 35 and a mass of lead or other heavy material 36. When the driving mechanism is rotating this mass 36 tends to act centrifugally to rotate the shoe 26 in the direction of the arrow 37 and to force the surface 35 into frictional engagement with the driven member. Stops 38 strike against the tube 34 and limit the inward movement of the free ends of the running clutch shoes 26.

For the purpose of forcing the starting clutch shoes 25 into contact with the driven members and forcing the running clutch shoes 26 out of such contact, two tension springs 40 are provided. Each of these springs are connected at one end to a pin 41 carried by a starting clutch shoe 25 and at the other end to a pin 42 carried by a running clutch shoe 26. These springs each tend to rotate one of the starting shoes 25 about a pin 24 in a direction opposite to that shown by the arrow 31 and to rotate one of the running shoes about the other pin 24 in a direction opposite to that shown by the arrow 37. In other words, each of the springs 40 tends to cause a starting shoe 25 to frictionally engage the driven mechanism and to hold a running shoe 26 out of engagement with the driven mechanism. It will be noted that the pins 41 are close to the pins 24 and the pins 42 are much further away from the pins 24, and the direction of pull of the springs 40 is such that they exert a weak turning moment on the starting shoes 25 and a much stronger moment on the running shoes 26.

The driven mechanism consists of a pulley 50 having an inner cylindrical face 51 to which is secured an annulus 52 of leather, rubber, or brake lining. The inner cylindrical face 53 of this annulus has approximately the same curvature as the faces 32 and 35 of the shoes 25 and 26 and may be frictionally engaged by these faces. The pulley 50 has a hub 55 rigidly fixed as by a key 56 on a driven shaft 57. The shaft 57 drives the vehicle by any well known means not shown.

The method of operation is as follows. The driver of the vehicle turns on the ignition circuit of the internal combustion engine and sets the throttle thereof at idling range. The parts being at rest, the springs 40 hold the starting clutch shoes 25 in frictional engagement with the face 53 and hold the running clutch shoes 26 out of such engagement. If now the driver pushes the vehicle forward the shaft 57 is turned and the pulley 50 turns the driving mechanism through the starting shoes 25, thus starting the engine which, due to the throttle setting, at once accelerates to idling speed. The weights of the masses 30 and the strength and method of attachment of the springs 40 is such, however, that the centrifugal force generated in the masses 30 is sufficient to overcome the tension of the springs 40 with the engine rotating at idling speed and the starting shoes 25 rotate in the direction of the arrows 31, thus moving the surfaces 32 out of frictional engagement with the surfaces 53. The surfaces 35 of the running shoes 26 being held out of frictional engagement with the surface 53, the engine can run free without any engagement between the engine and the driven parts of the vehicle.

If now the driver seats himself in the vehicle and opens the throttle enough so that the engine accelerates to running speed, the surfaces 35 of the running shoes 26 engage the surface 53 and the engine drives the vehicle forward. This is due to the fact that the weight of the mass 36 is sufficient to produce sufficient centrifugal force to overcome the tension of the spring 40. If at any time the driver throttles the engine down below running speed, the running clutch shoes disengage and the engine ceases to drive the vehicle. The engine will continue to run free unless it is throttled down to a point at which it will not idle. At this point the starting shoes take hold and the vehicle drives the engine which acts as a brake thereon. As long as the vehicle is in motion it is impossible, however, to stop or "kill" the engine unless the ignition is shut off.

I claim as my invention:

1. A clutch through which an internal combustion engine may drive the wheel of a vehicle and through which the wheel of the vehicle may drive said engine for the purpose of starting said engine, comprising: a driving member connected to and driven by the engine; a driven member connected to and driving the vehicle wheel; a running clutch shoe carried by said driving member; centrifugally operated means for forcing said running clutch shoe to frictionally engage a surface on said driven member when said driving member is rotated above a critical speed; a starting clutch shoe carried by said driving member; spring means tending to hold said starting clutch shoe in frictional engagement with said driven member; and centrifugal means for forcing said starting clutch shoe out of frictional engagement with said driven member, against said spring means, whenever said driven member is rotated at or above a starting clutch releasing speed which is slightly below said critical speed.

2. A clutch through which an internal combustion engine may drive the wheel of a vehicle and through which the wheel of the vehicle may drive said engine for the purpose of starting said engine, comprising: a driven member connected to and driving the wheel and having an inner cylindrical friction surface; a driving member connected to and driven by the engine; a running clutch shoe carried by said driving member in a position such that it can engage said surface when expanded; running clutch shoe spring means tending to hold said running clutch shoe out of engagement with such surface; a weight carried by said running clutch shoe and so placed as to be actuated by centrifugal force to a sufficient degree to overcome said running clutch shoe spring means and cause said running shoe to frictionally engage said surface whenever said driving means is rotated at a speed above a definite critical speed; a starting clutch shoe carried by said driving member in a position such that it can engage said surface when expanded; starting clutch shoe spring means tending to hold said starting clutch shoe in engagement with said surface; and a weight carried by said starting clutch shoe and so placed as to be actuated by centrifugal force to a sufficient degree to overcome said starting clutch shoe spring means and force said starting clutch shoe out of engagement with said surface whenever said driving means is rotated at or above a starting clutch releasing speed which is slightly below said critical speed.

3. A clutch through which an internal combustion engine may drive the wheel of a vehicle and through which the wheel of the vehicle may drive said engine for the purpose of starting said engine, comprising: a driven member connected to and driving the wheel and having an inner cylindrical friction surface; a driving member connected to and driven by the engine; a running clutch shoe carried by said driving member in a position such that it can engage said surface when expanded; running clutch shoe spring means tending to hold said running clutch shoe out of engagement with such surface; a weight carried by said running clutch shoe and so placed as to be actuated by centrifugal force to a sufficient degree to overcome said running clutch shoe spring means and cause said running shoe to frictionally engage said surface whenever said driving means is rotated at a speed above a definite critical speed; a starting clutch shoe carried by said driving member in a position such that it can engage said surface when expanded, said starting clutch shoe and said running clutch shoe being mounted on a single pivot carried by said driving means, said shoes extending in opposite directions from said pivot; starting clutch shoe spring means tending to hold said starting clutch shoe in engagement with said surface; and a weight carried by said starting clutch shoe and so placed as to be actuated by centrifugal force to a sufficient degree to overcome said starting clutch shoe spring means and force said starting clutch shoe out of engagement with said surface whenever said driving means is rotated at or above a starting clutch releasing speed which is slightly below said critical speed.

4. A clutch through which an internal combustion engine may drive the wheel of a vehicle and through which the wheel of the vehicle may drive said engine for the purpose of starting said engine, comprising: a driven member connected to and driving the wheel and having an inner cylindrical friction surface; a driving member connected to and driven by the engine; a running clutch shoe carried by said driving member in a position such that it can engage said surface when expanded; running clutch shoe spring means tending to hold said running clutch shoe out of engagement with such surface; a weight carried by said running clutch shoe and so placed as to be actuated by centrifugal force to a sufficient degree to overcome said running clutch shoe spring means and cause said running shoe to frictionally engage said surface whenever said driving means is rotated at a speed above a definite critical speed; a starting clutch shoe carried by said driving member in a position such that it can engage said surface when expanded; means for so attaching said spring means to said starting clutch shoe as to hold said starting clutch shoe in engagement with said surface; and a weight carried by said starting clutch shoe and so placed as to be actuated by centrifugal force to a sufficient degree to overcome said starting clutch shoe spring means and force said starting clutch shoe out of engagement with said surface whenever said driving means is rotated at or above a starting clutch releasing speed which is slightly below said critical speed.

FORD W. HARRIS.